(12) United States Patent
Callahan (10) Patent No.: US 9,258,133 B2
(45) Date of Patent: *Feb. 9, 2016

(54) ANONYMOUS DIGITAL IDENTIFICATION

(71) Applicant: Michael Callahan, Urbana, IL (US)

(72) Inventor: Michael Callahan, Urbana, IL (US)

(73) Assignee: One, Inc., Joliet, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,608

(22) Filed: Nov. 25, 2014

(65) Prior Publication Data

US 2015/0081446 A1 Mar. 19, 2015

Related U.S. Application Data

(63) Continuation of application No. 12/687,721, filed on Jan. 14, 2010, now Pat. No. 8,898,250.

(60) Provisional application No. 61/144,614, filed on Jan. 14, 2009.

(51) Int. Cl.

| | |
|---|---|
| *G06F 15/16* | (2006.01) |
| *H04L 12/18* | (2006.01) |
| *G06Q 30/02* | (2012.01) |
| *G06Q 30/08* | (2012.01) |
| *H04W 4/02* | (2009.01) |
| *H04L 29/08* | (2006.01) |
| *G06Q 10/08* | (2012.01) |
| *G06Q 20/12* | (2012.01) |
| *G06Q 20/32* | (2012.01) |
| *G06Q 50/00* | (2012.01) |

(52) U.S. Cl.
CPC .......... *H04L 12/1813* (2013.01); *G06Q 10/087* (2013.01); *G06Q 20/1235* (2013.01); *G06Q 20/327* (2013.01); *G06Q 30/02* (2013.01); *G06Q 30/0261* (2013.01); *G06Q 30/08* (2013.01); *G06Q 50/01* (2013.01); *H04L 67/18* (2013.01); *H04L 67/20* (2013.01); *H04L 67/22* (2013.01); *H04L 67/306* (2013.01); *H04W 4/02* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 2002/0010775 A1* | 1/2002 | Rakavy et al. | 709/224 |
| 2008/0120375 A1* | 5/2008 | Levy | 709/204 |
| 2008/0281668 A1* | 11/2008 | Nurminen | 705/10 |
| 2008/0300985 A1* | 12/2008 | Shamp et al. | 705/14 |
| 2009/0157473 A1* | 6/2009 | Belz et al. | 705/10 |
| 2010/0131584 A1* | 5/2010 | Johnson | 709/203 |
| 2010/0312646 A1* | 12/2010 | Gupta et al. | 705/14.58 |

* cited by examiner

*Primary Examiner* — Peling Shaw
(74) *Attorney, Agent, or Firm* — McAndrews, Held & Malloy (57) ABSTRACT

Methods and systems for anonymous digital identification are disclosed and may include detecting the presence of a first communication device associated with a first set of content that is distinguishable from an identifier associated with the first communication device, detecting the presence of a second communication device associated with a second set of content that is distinguishable from an identifier associated with the second communication device, and in response to a determination that the devices are geographically proximate to one another, providing matched content to at least one of the first and second devices. The matched content may be based at least in part on the first set of content, the second set of content, and a shared or complementary interest associated with the first and second devices. The interest may have been previously expressed by a user of the first or second devices.

23 Claims, 5 Drawing Sheets

ANONYMOUS DIGITAL IDENTIFICATION

CROSS-REFERENCE TO RELATED APPLICATIONS

This application is a continuation of application Ser. No. 12/687,721 filed on Jan. 14, 2010, which claims priority to U.S. Provisional Application Ser. No. 61/144,614 filed on Jan. 14, 2009. Each of the above stated applications is hereby incorporated herein by reference in its entirety.

BACKGROUND OF THE INVENTION

The present invention generally relates to anonymous digital identification. More particularly, the present invention relates to systems and methods for providing personalized digital content and consumer information using anonymous digital identification.

Parties communicate in a variety of ways: face-to-face, over the telephone, and by electronic mail, just to name a few. Despite the many ways in which people and businesses are able to communicate, however, innumerable opportunities for valuable communication are missed every day. For example, an unemployed mechanical engineer in search of a job may ride the same bus every morning as a human resources director for a local engineering firm who is searching for qualified applicants. While their physical paths may cross, they may never communicate with one another simply because they are unaware of their shared personal interests. If each somehow knew what the other was interested in or looking for, they would likely begin communicating and potentially form a mutually beneficial relationship.

Missed connections and overlooked opportunities for communication also occur between businesses and consumers. Research service estimates from 2007 indicate that advertising and marketing expenditures average well over $400 billion each year in the United States alone. Much of these valuable advertising dollars are allocated to blanketed and minimally targeted advertising, but these techniques are still tremendously inefficient in terms of the number of sales versus the number of targets and advertisements. This inefficiency stems from businesses' inability to closely match advertising content with the interests and wants of prospective consumers. Although minimally targeted advertising may, in many cases, be more effective than simply blanketing the general public, the rate of return on targeted advertising is still often quite low. However, if a business could target its advertisements to those potential customers who (1) have already expressed an interest in the item being advertised, and (2) are located physically near the storefront carrying the desired item, then such advertisement is likely to be significantly more effective than other techniques. Furthermore, embodiments of the present invention may allow a business to understand its customer more thoroughly by providing in-depth, real-time information related to the buying habits, interests, activities, demographics, and most importantly, the desired purchases of existing and potential customers.

Prior art systems have attempted to use location detection technologies to promote social networking but present significant shortcomings. For example, the invention described in U.S. Pat. App. Pub. No. 2005/0250552, filed by Eagle et al. (Eagle), utilizes Bluetooth technology to facilitate communication between Bluetooth-enabled devices in detectable range of one another, particularly for purposes of developing interpersonal relationships. The invention described in U.S. Pat. No. 7,071,842, issued to Brady, Jr. (Brady), utilizes Global Positioning System (GPS) coordinates to identify people, places, and things based on a user's stated preferences. However, neither Eagle nor Brady discloses a multi-modal system for anonymous digital identification that facilitates widespread adoption and cross-platform usage. Moreover, neither Eagle nor Brady discloses the customization of advertising content for purposes of improving customer experience and increasing advertisement effectiveness. Neither discloses a system that allows consumers to communicate their purchasing desires to merchants and facilitates commercial transactions between buyers and sellers. Additionally, neither utilizes a multi-modal anonymous identification system for purposes of gathering, analyzing, and selling to businesses a wide range of consumer data.

Other prior art systems provide anonymous digital identification or distributed electronic commerce, but these systems also present shortcomings. For example, U.S. Pat. No. 6,490,567, issued to Gregory (Gregory), is directed to distributed electronic commerce over a network, in which merchant content is separated from transaction functionality. The invention described in U.S. Pat. No. 6,879,960, issued to Nascenzi et al. (Nascenzi), utilizes anonymous identification tags in the context of electronic commerce. However, neither Gregory nor Nascenzi discloses, for example, the use of location detection technologies in order to facilitate targeted commercial transactions between commercial entities and customers. Moreover, neither discloses a multi-modal anonymous identification system, particularly one capable of compiling and processing consumer data for commercial entities.

DETAILED DESCRIPTION OF THE INVENTION

Figure 1:
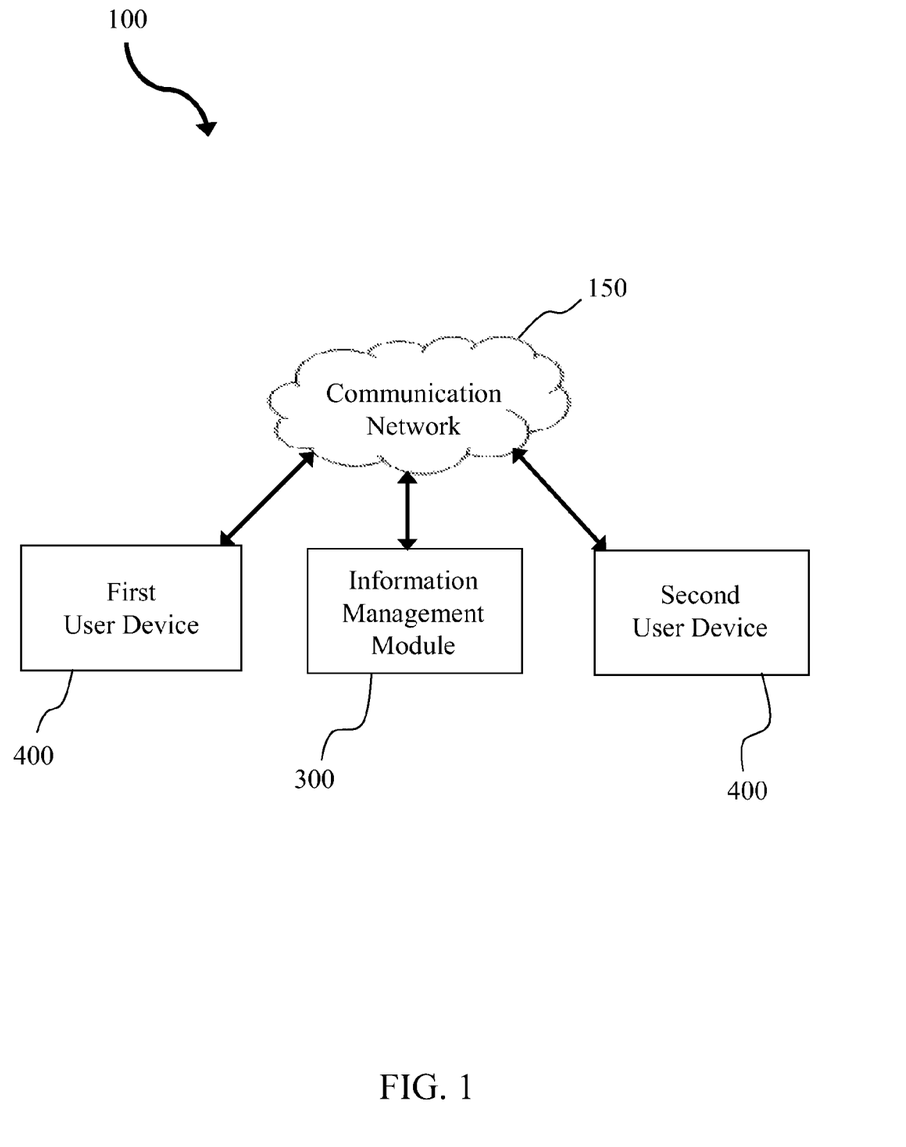
FIG. 1 illustrates a block diagram of an anonymous digital identification system according to an embodiment of the present invention.

FIG. 1 illustrates a block diagram of an anonymous digital identification system 100 according to an embodiment of the present invention. The anonymous digital identification system 100 includes a communication network 150, an information management module 300, and first and second user devices 400.

The communication network 150 is in bidirectional communication with the first user device 400, the information management module 300, and the second user device 400. In certain embodiments, one or more of the first user device 400, the information management module 300, and the second user device 400 may be configured for direct communication with one another. For example, in an embodiment, the first user device 400 may directly communicate with the information management module 300, rather than communicating through the communication network 150.

In operation, the system 100 allows two or more entities to interact with one another using anonymous digital identification. An entity may include, for example, a person, a group of people, an electronic device, a business, or any other content provider. In an embodiment, an entity may communicate its interests, desires, and/or other content to the information management module 300 via the communication network 150. For example, a first user device 400 may communicate a first user's interests to the information management module 300 via the communication network 150. Similarly, a second user device 400 may likewise communicate a second user's interests to the information management module 300 via the communication network 150. The information management module 300 and/or the first and second user devices 400 may also be adapted to identify proximate user devices 400. In an embodiment, the first user device 400 may detect the presence of the second user device 400 once they are geographically proximate to one another by using one or more wireless technologies, such as Bluetooth. The bounds of geographic proximity may be limited by the information management module 300, the user devices 400, and/or the capabilities of the location detection technologies being employed. Embodiments of the user device 400 utilizing Bluetooth may use standard and non-standard inquiry modes of operation and inquiry levels employing general, limited, and/or dedicated inquiry access codes in order to securely identify and communicate with other Bluetooth-enabled devices. In certain embodiments, the information management module 300 detects the respective locations of the first user device 400 and the second user device 400 as being geographically proximate to one another, for example, using GPS coordinates associated with each user device 400 supplied via the communication network 150. Once a detection of proximate user devices 400 has been made, the information management module 300 determines whether the account records associated with each of the first user device 400 and the second user device 400 include any matching or complementary interests. If a matching interest is identified, then matched content is provided to one or both of the first user device 400 and the second user device 400.

For example, the system 100 may be used to connect two persons who are located near one another and share a common interest. In this example embodiment, the first user device 400 may be a first person's cellular phone, which has been associated with an account record that includes the first person's interest in playing basketball. Similarly, the second user device 400 may be a second person's notebook computer, which has been associated with an account record that includes the second person's interest in playing basketball. Each of these interests is communicated to the information management module 300 via the communication network 150. Using the communication network 150, the information management module 300 may detect the respective locations of the cellular phone and the notebook computer as being geographically proximate to one another when, for example, the first and second users are riding on the same bus. Once this detection has been made, the information management module 300 determines that the first user device 400 and the second user device 400 have been associated with the common interest of playing basketball. As a result, the information management module 300 provides the first user device 400 and the second user device 400 with relevant matched content, such as the image of a basketball that is displayed on the notebook computer and cellular phone screens. The display of this image indicates to the first and second users that the system 100 has identified a nearby entity that shares an interest in playing basketball. In an embodiment, the information management module 300 may be configured to provide additional content to the first user device 400, for example, if the first person clicks on the image of the basketball displayed on the cellular phone. Such additional content may include an image of the second person, who is associated with the second user device 400, or may include generally relevant content such as current news about playing basketball, advertisements for basketball-related products or services, or the ability to purchase merchandise related to playing basketball. Based on the content provided by the information management module 300, the first person may wish to approach the second person, both of whom are on the same bus, in order to discuss their common interest in playing basketball.

Because communication between the first user device 400 and the second user device 400 takes place through the intermediate information management module 300, such communication may be entirely anonymous. In alternative embodiments, the operator of the first user device 400 and the operator of the second user device 400 may choose to communicate directly without the intervention of the information management module 300, for example, via a Bluetooth connection. Additionally, users may be prompted by the information management module 300 and/or their user devices 400 prior to the transmission of user information as to whether and what information may be sent. Anonymous digital identification is made possible by the system 100 because electronic communication devices, such as cellular phones, GPS receivers, digital cameras, Bluetooth receivers, video game consoles, and computers, are typically associated with one or more unique identifiers. For example, a cellular phone handset is associated with a unique International Mobile Equipment Identity (IMEI) number. Similarly, a Universal Unique Identifier, or UUID, is a 128-bit number that may be used to identify, for example, a piece of hardware, a software object, or an entity on the Internet. Although it is theoretically possible for two objects to be assigned the same UUID, such an occurrence is so mathematically improbable that UUIDs are generally regarded as unique. In certain embodiments, a unique identifier may be associated with the environment surrounding the user device 400 and/or the operator of the user device 400. For example, the identifier may be the operator's voice, face, or fingerprint.

In varying embodiments, the communication network 150 may utilize a variety of communication technologies. For example, the communication network 150 may utilize wireless technologies such as Global System for Mobile communications (GSM), Code Division Multiple Access (CDMA), WiFi, GPS, Bluetooth, wireless Universal Serial Bus (USB), and/or infrared. Additionally, proprietary wireless standards utilizing audible, optical, and/or radio technologies may be used. In still other embodiments, communication may occur via direct electrical connection.

In a preferred embodiment, the system 100 is multi-modal, allowing detection of and communication between user devices 400 of varying types. For example, both a personal computer utilizing WiFi technology and a laptop utilizing wireless USB technology may each be detected by and communicate with the information management module 300. Similarly, a mobile phone without Internet capabilities may nonetheless interact with a nearby mobile phone via audio signals that are undetectable by the human ear. Such audio signals may be transmitted by each phone's speaker and received by each phone's microphone, for example. In such embodiments, the microphone may be accessed locally by the phone handset or remotely by the information management module 300. Audio signals stemming from another user device 400 may be detected by establishing an average level of ambient noise in the location of the user device 400 based on a periodic reading by a microphone associated with the user device 400 and comparing the current audio levels with this average level.

In varying embodiments, the location detection described above with regard to FIG. 1 may be accomplished in numerous ways. For example, the location of proximate user devices 400 may be determined using techniques such as GPS tracking, multilateration, triangulation, and/or mobile positioning. Proximity between devices may also be determined based on, for example, Bluetooth and/or audio signal strength comparisons and response times. In an embodiment, the system 100 is multi-modal in its ability to detect device locations and proximity between two or more devices.

In varying embodiments, the system 100 may be used in a variety of ways to connect people or groups of people with shared interests or objectives. The system 100 may assist in forming new platonic, romantic, and professional relationships based on both geographic proximity and common interests or characteristics. To facilitate meaningful connections, the system 100 may be configured to allow entities to customize the information they share with others. For example, a woman having a first user device 400 who is interested in forming a jazz band and is also seeking a job as a software developer may customize her user device 400 and its associated account record accordingly. As a result, the information management module 300 may communicate her professional resume to a technical recruiter in close proximity who has configured his second user device 400 and its associated account record with his interest in recruiting job candidates with software development experience. Similarly, the information management module 300 may communicate the first user's interest in forming a jazz band to a second user in close proximity who has configured his second user device 400 with his current status as a jazz band member. However, the technical recruiter would not necessarily receive information about the first user's jazz interests, just as the current jazz band member would not necessarily receive the first user's professional resume. Therefore, the system 100 is capable of identifying specific, meaningful points of connection between users, and users are able to customize the amount and type of information that is communicated to other types of users.

In certain embodiments, the system 100 may also facilitate commercial transactions between entities. For example, an individual may currently own a bicycle that he or she would like to sell for at least $50. This person could configure her first user device 400 and its associated account with her interest in selling the bicycle, her minimum price, and the specifications and age of the bicycle. A second person may be seeking a bicycle of a certain type and is willing to pay $50 for the bicycle. This second person may configure his second user device 400 and its associated account with these interests. In varying embodiments, each person's information may be stored locally on the device itself and/or remotely with the information management module 300. When the first user device 400 and the second user device 400 become geographically proximate to one another, the information management module 300 may communicate with each device in order to convey their shared interest and the opportunity for a mutually beneficial transaction. In an embodiment, the system 100 may be configured to allow one or both users to communicate anonymously prior to completing the transaction. For example, the potential buyer may have a question about the product being offered, and the information management module 300 may facilitate anonymous communication with the potential seller via email, instant messaging, Short Message Service (SMS) text messaging, Multimedia Messaging Service (MMS) communication, and/or other communication protocols. Additionally, the system 100 may be adapted to allow the entire transaction to take place with anonymity using, for example, a PayPal account associated with each user or financial information stored in the system 100. As described below with regard to FIG. 2, additional features may be beneficial when one or both of the parties to a potential transaction is a business.

Figure 2:
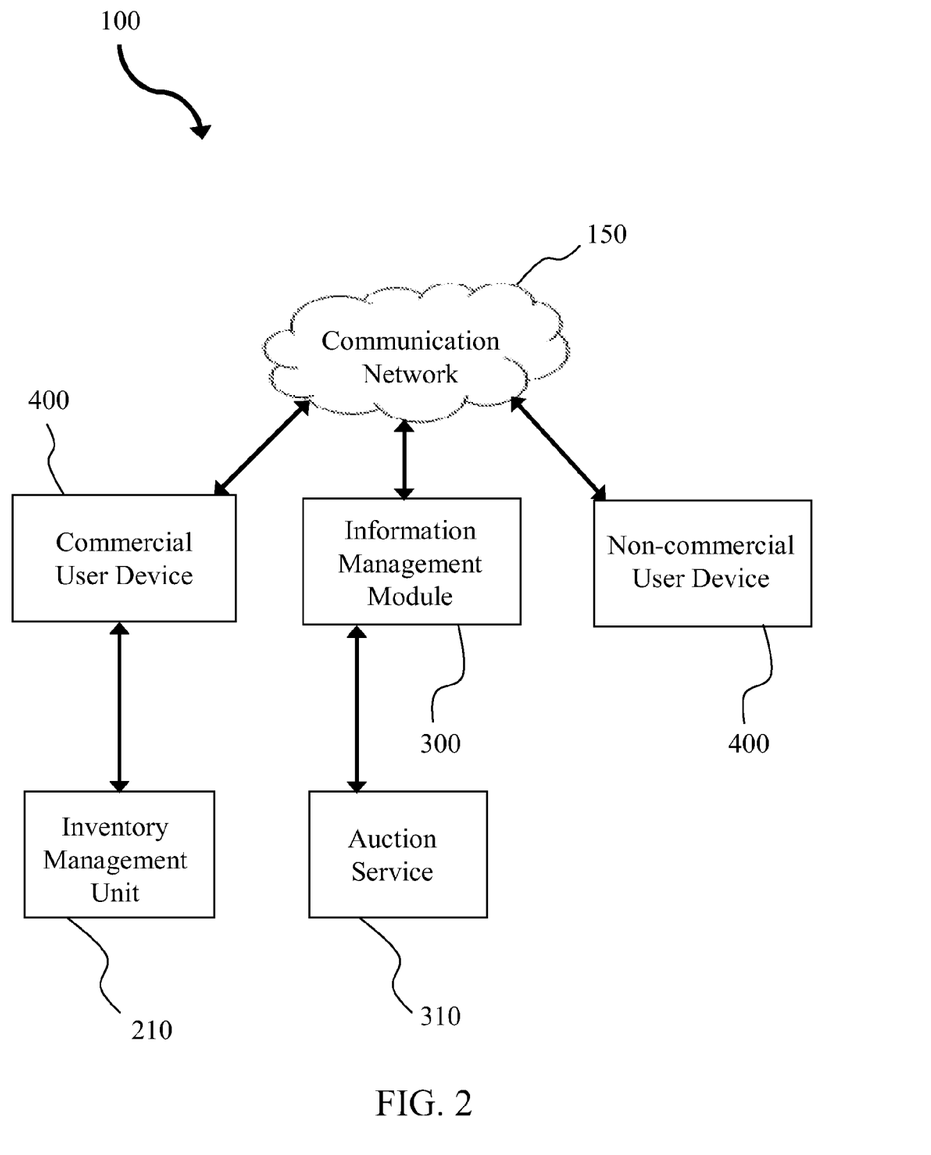
FIG. 2 illustrates a block diagram of an anonymous digital identification system according to an embodiment of the present invention.

FIG. 2 illustrates a block diagram of the anonymous digital identification system 100 of FIG. 1 according to an embodiment of the present invention. The anonymous digital identification system 100 includes the communication network 150 and the information management module 300 of FIG. 1. The system 100 further includes a commercial user device 400, an inventory management unit 210, an auction service 310, and a non-commercial user device 400.

The communication network 150 is in bidirectional communication with the commercial user device 400, the information management module 300, and the non-commercial user device 400. The commercial user device 400 is also in bidirectional communication with the inventory management unit 210, and the information management module 300 is in bidirectional communication with the auction service 310.

As described above with regard to FIG. 1, the system 100 may be used to facilitate commercial transactions between entities. In operation, the system 100 may be configured to allow commercial entities to compete with one another through the auction service 310. Two or more commercial entities may compete, for example, for the right to be associated with a certain interest, product, service, location, and/or characteristic. Additionally, the inventory management unit 210 may allow commercial entities to make real-time decisions and provide accurate notifications based on its inventory or availability at a particular time.

An example application of the system 100 of FIG. 2 may involve the advertising and sale of running shoes to a customer. First, using the auction service 310, two or more sporting goods stores compete for the right to be associated with a particular pair of running shoes in a particular geographic area, such as a shopping mall. The auction service 310 may be adapted to include a database of product and service information, locations, advertisements, and other content. If multiple sporting goods stores in the shopping mall all sell a particular pair of running shoes for the same price, then each may attempt to outbid one another for the right to provide content to a potential customer who enters the shopping mall and is seeking to purchase that particular type of footwear. The commercial entity who makes the highest financial offer for the association to the auction service 310 then pays the final auction price to the operator of the information management module 300. Additionally, the winner of the auction uses the commercial user device 400 to upload content such as an advertisement to the information management module 300. Once the content is stored by the information management module 300, the content is provided to the non-commercial user device 400 once the information management module 300 determines that the non-commercial user device 400 has reached a particular location specified by the winning commercial entity. In varying embodiments, the non-commercial user device 400 may be configured to receive only certain types of content from commercial entities. In alternative embodiments, a commercial entity may also purchase general advertising space from the operator of the information management module 300, either by auction via the auction service 310 or under some other agreement. Such advertisements or other content may then be communicated to geographically proximate non-commercial user devices 400.

Returning to the example above, once the potential purchaser seeking to buy running shoes is geographically proximate to, for example, a commercial user device 400 located within a sporting goods store, his or her non-commercial user device 400 receives content from the highest bidder among commercial entities and/or the commercial entity having the product or service that most closely matches various criteria. These criteria may include the potential purchaser's preferences with regard to model, size, price, color, and/or other features of the desired running shoes.

In an embodiment, once the potential purchaser is notified that an item or service matching his or her criteria is available nearby, the transaction may be completed by the non-commercial user device 400 communicating with the commercial user device 400 via the communication network 150 and the information management module 300. For example, when a prospective running shoe purchaser approaches a sporting goods store and the purchaser's non-commercial user device 400 receives content from a commercial user device 400 associated with the store, the purchaser may be able to purchase the pair of shoes immediately using the non-commercial user device 400. In certain embodiments, the prospective purchaser may obtain additional information beyond just the content received by the non-commercial user device 400. This additional content may originate from the original commercial entity or may come from another source.

In order to provide accurate information as to product or service availability, the commercial user device 400 communicates with the inventory management unit 210. The inventory management unit 210 may be configured to provide real-time information as to the availability of products and/or services. The inventory management unit 210 is accessed when availability information is to be communicated to a geographically proximate non-commercial user device 400. The inventory management unit 210 may be updated when a product is sold in order to reflect the commercial entity's real-time inventory. Likewise, if availability is more relevant than product inventory for a commercial entity, such as would be the case for a dentist's office, then the inventory management unit 210 may be updated when availability changes in some way, such as when a patient books an appointment with a dentist.

In certain embodiments, if no product or service matching the potential purchaser's criteria is currently available, the system 100 may be adapted to facilitate a transaction in a variety of ways. For example, the information management module 300 may provide content to the non-commercial user device 400 regarding the closest match that could be identified within close proximity. Alternatively, the information management module 300 may provide content to the non-commercial user device 400 regarding matching products or services that are currently available but are not geographically proximate in relation to the non-commercial user device 400. This identification may take place automatically once no local match is found, or it may take place only in response to a request communicated by the non-commercial user device 400 to the information management module 300. In an embodiment, the potential purchaser's criteria, such as price and quantity, that have been communicated from the non-commercial user device 400 to the information management module 300 may be communicated to non-local entities as well. For example, the purchase criteria may be posted to a website or communicated directly to one or more devices associated with entities that have requested and/or paid for such information.

In addition to providing a streamlined way to purchase goods and services, the system 100 may also be adapted to facilitate the efficient transfer of used items. Prior art systems and techniques offer a number of options for reselling used items, but all of these options present inefficiencies and missed opportunities. For example, if a person purchases a video game console from a retail store and, after several months, wishes to resell it, she would have several options using only prior art systems and techniques. She could take photos of the item, write a detailed description of it, and submit this information to an online marketplace such as eBay, also creating an account with the website if she does not already have one. If the item eventually sells, she is responsible for shipping the item as well. Alternatively, she could avoid having to take photos and write a detailed description of the item by finding a similar post on a website such as Amazon.com. However, shipping is still likely to be required. Yet another alternative that could help avoid shipping issues would be to focus on a more local level, such as by hosting a garage sale, placing a classified ad in the local newspaper, or posting an ad with an online marketplace that includes localized classified ads, such as Craigslist.org. The first two of these options typically require a significant investment of time and/or money and still are not sufficiently targeted at potential purchasers. Online classified ad spaces allow for searching and a more localized approach but still present significant limitations. Although these websites may allow parties to avoid shipping and receiving costs and inconveniences, such services may only be available or widely used in highly populated areas. Moreover, even targeted advertising within one's own city can result in many missed opportunities.

In contrast, certain embodiments of the present invention facilitate optimal efficiency in the transfer of used items, while requiring minimal effort by the buyer and seller. A user of the system 100 may communicate data regarding a prior-purchased item to the information management module 300, and this data may then be communicated to another user of the system 100. The matching and location detection capabilities of the system 100 maximize opportunity and minimize required effort. For example, a first person may purchase a video game from a retailer using her non-commercial user device 400 after she had come in close proximity with a commercial user device 400. If she made the purchase using her non-commercial user device 400 or otherwise provided information about the purchase to the information management module 300 by, for example, providing access to the records of her credit card transactions, then a record of the video game purchase may be maintained by the information management module 300. In an embodiment, this record may include images of the purchased item, the date it was purchased, a detailed description of the item, the purchase price, the physical characteristics of the item, or other relevant content. Therefore, when the user wishes to resell, donate, or otherwise transfer the item to another, she may simply access the purchase record using the non-commercial user device 400 or another electronic device in communication with the information management module 300 and indicate that she no longer wishes to keep the item. Additionally, she may provide updated information as well, such as a current photo of the item, which may be taken by the user device 400 if it has picture-taking capabilities. In effect, getting rid of the video game becomes one of her interests, and the system 100 therefore seeks to identify geographically proximate users who share a complementary interest. In this case, when a second user device 400 that has communicated an interest in purchasing the same video game comes into geographic proximity with the seller's first user device 400, the information management module 300 may notify each device as to the presence and interests of the other. In other embodiments, some or all detection of geographically proximate user devices 400 may be performed by each user device 400. Using the system 100, therefore, entities may passively search for potential buyers, sellers, donors, and beneficiaries wherever they go. Applying the video game example, the current owner may use the system 100 to discover that a colleague whom she sees every day would like to purchase the precise item she is trying to sell. She need not advertise her desire to sell the video game to all colleagues in her workplace. The system 100 selectively targets only those in close proximity who have already expressed a complementary or shared interest by communicating with the information management module 300. In effect, she exerted almost no effort in advertising her available video game to only those entities that were both nearby and already interested in purchasing the item. Thus, the system 100 may be adapted to passively produce advertisements that may be narrowly targeted by interest level and location, maximizing transaction efficiency and capitalizing on everyday opportunities that may otherwise be missed. Additionally, in certain embodiments, the operator of the user device 400 may modify the proximity bounds within which searches are performed.

In varying embodiments, the auction facilitated by the auction service 310 may be structured in a variety of ways. For example, the auction could occur daily, weekly, or in accordance with some other schedule. In one embodiment, the auction service 310 may be configured to prevent commercial entities from seeing each other's bids as the auction is taking place. Alternatively, the auction service 310 may provide commercial entities with the ability to view each other's bids. The auction may also be configured to include a reserve (minimum) price specified by the operator of the information management module 300. In this embodiment, if the reserve price is not met by any commercial entity's financial offer, the right to be associated with a particular product, service, interest, search term, or other associable element is not sold. In a preferred embodiment, the commercial entity that placed the highest financial offer for a given associable element may provide certain content to the information management module 300 that will be the first content provided to user devices 400 in the specified geographic area when the information management module 300 is searched for content matching the associable element. In the alternative, the auction service 310 may be configured to allow more than one commercial entity to purchase association rights. For example, the content provided by the two commercial entities that made the two highest financial offers for a particular association right may be associated with that associable element by the information management module 400. Alternatively, the information management module 300 may be configured to provide commercial entities with the ability to purchase the association right for a pre-determined fee, either as an option within the auction format via the auction service 310 or in lieu of the auction altogether.

In still other embodiments, the system 100 allows for efficient, targeted advertising. For example, a digital display located outside a retail electronics store may be connected to the store's inventory management unit 210 and/or may be connected to a storage memory containing information related to the store's products and/or promotions. A commercial user device 400 may be connected to the digital display and may communicate the store's interests in selling items to the information management module 300. When a person approaches the digital display, the person's non-commercial user device 400 and the store's commercial user device 400 detect the presence of one another, and the information management module 300 indicates to one or both parties what their matching and complementary interests are. Upon receiving notification that a nearby person is interested in purchasing a particular model of digital camera, commercial user device 400 may transmit content to the digital display related to the desired camera. Later, when a subsequent person interested in purchasing a particular type of stereo approaches the same digital display, content related to the stereo is displayed. Prior art advertising techniques employed by stores utilize non-specific static displays that advertise one product to the store's entire audience and/or non-specific dynamic displays that advertise several products to the store's entire audience on a timed, rotational basis. However, the system 100 allows a store to narrowly tailor its advertisements to very specific, already-interested audiences in an extremely dynamic way. Rather than bombarding prospective customers with advertisements of no interest to them, entities may focus their efforts and deliver clear, highly relevant content to potential customers. Using the system 100, therefore, entities may decrease advertising expenditures but nonetheless improve sales by utilizing better targeted advertising.

In certain embodiments, the system 100 may be configured to allow the communication of advertisements not specifically directed to a user's interests. For example, advertisements may be allowed for complementary goods and services. Thus, an advertisement for a camera case may be communicated to the purchaser of a new camera. Even though the purchaser may have expressed an interest only in purchasing a camera, a camera case is so commonly bought in conjunction with new camera purchases that it may still be considered highly relevant content. In an embodiment, the purchaser may provide feedback to the information management module 300 relating to the relevance of the additional content. This feedback may be used, for example, to curb abuse by retailers in providing purchasers with irrelevant content that they do not wish to receive. If an entity receives sufficiently negative feedback in this regard, the information management module 300 may place restrictions on the entity's interactions with the system 100 or may altogether suspend the entity's participation. The system 100 may allow purchasers to avoid receiving content not directly related to their interests in a variety of other ways as well. For example, the purchaser may receive a prompt at the conclusion of a purchase asking whether they wish to receive content relating to complementary goods or services. Alternatively, the purchaser may communicate to the information management module 300 that she does not wish to receive any content besides that which matches her interests exactly or that she only wishes to receive certain types of complementary content. In other embodiments, the content may relate only to what others who purchased the same item also purchased. This information may originate from the store's records and/or the records maintained by the information management module 300. In an embodiment, the operator of the user device 400 may selectively modify the communication settings associated with any of his or her information. For example, if the operator wishes to receive no advertising content associated with her interest in photography, then she may dynamically modify the communication settings associated with her photography interests at any time, allowing her to avoid receiving any advertising content related to photography if desired. In varying embodiments, this setting may be pre-established by the operator and/or may be modified dynamically at any time.

In certain embodiments, the system 100 may also be adapted to allow timely, anonymous feedback regarding entities, products, services, and/or experiences. For example, the purchaser of an item may rate the seller and/or item by communicating with the information management module 300. In an embodiment, requests for feedback are communicated to the user device 400 by the information management module 300 after a specified period or substantially immediately following a commercial transaction and/or a transmission of matched content. In an embodiment, this feedback may allow the information management module 300 to progressively learn more about the interests and preferences of the user providing feedback, enhancing the user experience by improving the quality of content provided by the information management module 300.

In certain embodiments, the information that a commercial entity may provide to the information management module 300 for purposes of identifying matched content may be restricted in a variety of ways. For example, the information management module 300 may be configured to limit the amount and/or type of data that may be provided by a commercial entity. In other embodiments, a commercial entity may include hyperlinks or other pointers among the information it provides to the information management module 300.

By providing functionalities that may be used by commercial entities to improve their marketing, advertising, and buying strategies, the operator of the system 100 may generate revenue in a variety of ways. For example, the system 100 may be configured to log the buying and selling habits of users who have created an account with the system 100. Evidence of a user's commercial habits may include records of commercial transactions, of both new and used items and services, completed with her user device 400. Information relevant to commercial entities may also include the interests of users, as well as information about the items that users are currently looking to purchase and what they are willing to pay for them.

The system 100 may also track the reactions of users to advertisements and/or promotions presented to them via the user device 400. The information management module 300 further includes real-time information about the geographic location of the user device 400, as well as in-depth demographic information for users of the system 100. Harnessing some or all of this information, a commercial entity could much more effectively target and maintain customers, establish brand significance among those most receptive to its market segment, allocate inventory more accurately across geographic locations, and shift valuable advertising dollars away from non- and minimally-targeted, largely ineffective advertisements toward narrowly-tailored campaigns more likely to induce sales and consumer adoption. In certain embodiments, non-commercial users may elect not to allow some or all of this data to be used by commercial entities. In an embodiment, a non-commercial user who wishes to restrict the transfer of information associated with her account to commercial entities may be required to pay a subscription fee for use of the system 100, whereas granting full access may result in no subscription fee being assessed.

In certain embodiments, a wide variety of data may be offered to commercial entities by the operator of the system 100. For example, such data may include the average time between a user first indicating her desire to purchase an item and her actual purchase of the item, as well as the entity from whom she ultimately purchased the item. Such information may be useful in providing a competitive analysis of the commercial entity's standing in comparison to its competitors, and such an analysis may be readily made with regard to certain products or services, certain demographics, and/or certain periods of time. In certain embodiments, this degree of data processing may be performed by the information management module 300 or another device associated with the operator of the system 100, whereas in other embodiments, raw data may be provided to the commercial entity itself or to a third party firm capable of interpreting raw consumer information into, for example, recommended strategies for the relevant commercial entity. In certain embodiments, commercial entities may also obtain information regarding how and/or when users of the system 100 make purchases. For example, if many users tend to utilize their non-commercial user devices 400 to make purchases with vendors that support such functionality, then a commercial entity may wish to provide that capability to its customers if it has not already. Analogous conclusions may be drawn if users tend to make purchases with credit cards, between Tuesdays and Thursdays, on store websites, late at night, or through third-party websites such as Amazon.com, for example.

Assuming raw data represents a first level of consumer information and processed data represents a second level of consumer information, the information management module 300 may provide a third level of consumer information in certain embodiments. This third level of information may consist of extrapolated consumer data based on information that the system 100 learns about its users. For example, the information management module 300 may be adapted to extrapolate information about a user's family members, based on data obtained about the user over time. For some users, such extrapolated information may be useful in the context of activities such as gift purchasing. For example, a female user of the system 100 may make clothing purchases for her family using her non-commercial user device 400. She may have already provided information to the information management module 300 about her own clothing sizes, but she may not have provided such information about the members of her family. Over time, however, the information management module 300 may detect that the user tends to regularly purchase men's shirts of a particular size. In fact, the user may make purchases of this same general type during the same week for a period of years. Based on this information, the information management module 300 may deduce that the user makes these annual men's shirt purchases as a gift for someone such as the user's husband, father, or son. Once this inference has been made, the information management module 300 may anticipate the user's desire to make such a purchase the following year and, for example, notify her of men's shirt sales occurring during or before the week she tends to shop for the gift each year. Additional relevant content, such as the opportunity to send an electronic greeting card, may also be provided to the user. Of course, the ability of the system 100 to learn about its users may be utilized outside the context of gift purchasing and may provide valuable information to both commercial and non-commercial entities.

The operator of the information management module 300 may utilize a variety of fee structures for commercial entities utilizing the system 100 and/or the valuable commercial data generated by it. For example, a commercial entity may be charged based on the type of market, demographic, geographic, or other data it wishes to receive. The operator may also charge commercial entities a one-time fee for registering their own commercial user devices 400 with the system 100. Additionally, a commercial entity may be charged based on the amount of content it provides to the information management module 300, or it may be charged based on the frequency with which its content is identified as matched content and transmitted to a user device 400. Alternatively, a commercial entity may be charged a periodic subscription fee that allows the commercial entity to provide a limited or unlimited amount of content to the information management module 300. A commercial entity may also be charged based on the number of requests for matched content that it communicates to the information management module 300. The operator of the information management module 300 may also offer a trial period for commercial entities that are new to the system 100. Furthermore, in certain embodiments, a commercial entity may pay additional fees to be listed among relevant but unmatched content that is provided to a geographically proximate user device 400. In an embodiment, a commercial entity may also be charged a rental or purchase price for a commercial user device 400 that is adapted for use with the system 100.

In varying embodiments, the commercial user device 400 may be configured in a variety of ways, providing additional revenue opportunities to the operator of the system 100. For example, the commercial user device 400 may comprise an electronic device already in use by a commercial entity, such as a store's primary computer system, that is configured with software allowing it to interact with the system 100. In this embodiment, the commercial entity need not obtain additional hardware, and if the commercial entity's existing equipment does not include a device capable of proximity sensing, such as a Bluetooth receiver, then proximity determinations may be made by the information management module 300, for example, based on the address of the commercial entity's storefront and the GPS coordinates associated with a non-commercial user device 400. Thus, the information management module 300 may facilitate the exchange of matched content even when the commercial user device 400 is incapable of sensing the proximity of a nearby non-commercial user device 400. Alternatively, the commercial entity may simply upgrade its existing equipment with a proximity sensing device in order to detect the presence of non-commercial user devices 400.

In an alternative embodiment, the commercial user device 400 may just be an electronic locating device, such as a GPS or Bluetooth receiver associated with a commercial entity. In this embodiment, when a non-commercial user device 400 came within close proximity of the commercial user device 400, the former may detect the presence of the latter and an anonymous digital identifier associated with the commercial user device 400, such as its UUID number. This identifier may then be communicated to the information management module 300 via the non-commercial user device 400, and matched content from the commercial entity associated with the unique identifier may then be communicated to the non-commercial user device 400.

In still other embodiments, the commercial user device 400 may be a key part of a sophisticated enterprise system. For example, a complex commercial entity such as a large department store may utilize the commercial user device 400 in a variety of ways. As illustrated in FIG. 2, the department store may configure the commercial user device 200 to communicate with the inventory management unit 210. The inventory management unit 210 may be adapted to manage allocation and availability of products and/or personnel, and the inventory management unit 210 may be in communication with a mainframe associated with the store's headquarters. Additionally, using some or all of the consumer information described above, a store may be able to increase sales and enhance its customers' purchasing experience. For example, a sales associate at the store may utilize a tablet PC that functions as a commercial user device 400 or is in communication with one. Once a non-commercial user device 400 is detected in close proximity, consumer information about its operator may be communicated to the tablet PC via the information management module 300. Such consumer information may include, for example, the specific items the operator is interested in purchasing, how long she has been looking to purchase those items, her buying history at the store or its competitors, whether she is a member of the store's rewards or credit card program, the brand names she prefers, her clothing size, whether she has entered the store in the past month, and/or her income level. With this information about each of his prospective customers in close proximity, the sales associate may more easily determine who is most likely to make a purchase, how best to approach each customer, and whether they are relatively sophisticated customers with regard to the type of product being sold. Utilizing these key pieces of information, the sales associate is more likely to drive sales, up-sell effectively, and provide a more personalized customer service experience. In an embodiment, the commercial user device 400 may be adapted to obtain this information in real-time from the information management module 300.

In certain embodiments, the characterizations described above with regard to the commercial user device 400 may apply equally to the non-commercial user device 400, and vice-versa. Similarly, the alternative embodiments described herein may apply to the first and second user devices 400 of FIG. 1 and to the commercial and non-commercial user devices 400 of FIG. 2.

Certain embodiments also contemplate the use of the system 100 in the context of volunteering and other humanitarian opportunities. Many people do not take advantage of such opportunities because they are unaware of any that match their interests, availability, and resources. Moreover, people are often unaware of such opportunities in their local geographic area but would feel more closely connected, and thus likely to provide assistance, if such an opportunity was conveniently located near them. For example, a busy office worker may walk past a soup kitchen on his way to work everyday, but he may never take the opportunity to volunteer his time at the kitchen because he is unaware of its location or does not know whether his schedule could accommodate such an activity. However, using a first user device 400, the soup kitchen may provide the information management module 300 with information about volunteering opportunities at the kitchen, such as what shifts are available, whether training is required, whether volunteering may only be done on a recurring basis, and/or whether any experience is necessary. Similarly, using a second user device 400, the busy office worker may provide information management module 300 with information such as the types of volunteering opportunities he would be open to, his volunteering or professional experience, and/or the hours or days he would be available to volunteer. In an embodiment, the busy office worker need not even provide availability information and may instead indicate that any time not otherwise occupied on the electronic calendar associated with the second user device 400 may be considered available. After both parties have provided information about their interests, the next time their respective user devices 400 are in close proximity to one another, one or both may be notified of their common interest by the information management module 300. As a result, the busy office worker's second user device 400 may receive content indicating, for example, the location of the soup kitchen, a description of the opportunity, and a future period of time during which the soup kitchen needs volunteers and the office worker is available. By removing the lack of information and streamlining the communication process in a way that requires minimal effort by either party, the system 100 allows geographically proximate parties to see how their interests align, without necessitating any direct communication between the parties themselves.

In addition, the alternative embodiments described above with regard to FIG. 1 are also applicable to the anonymous digital identification system 100 illustrated in FIG. 2.

Figure 3:
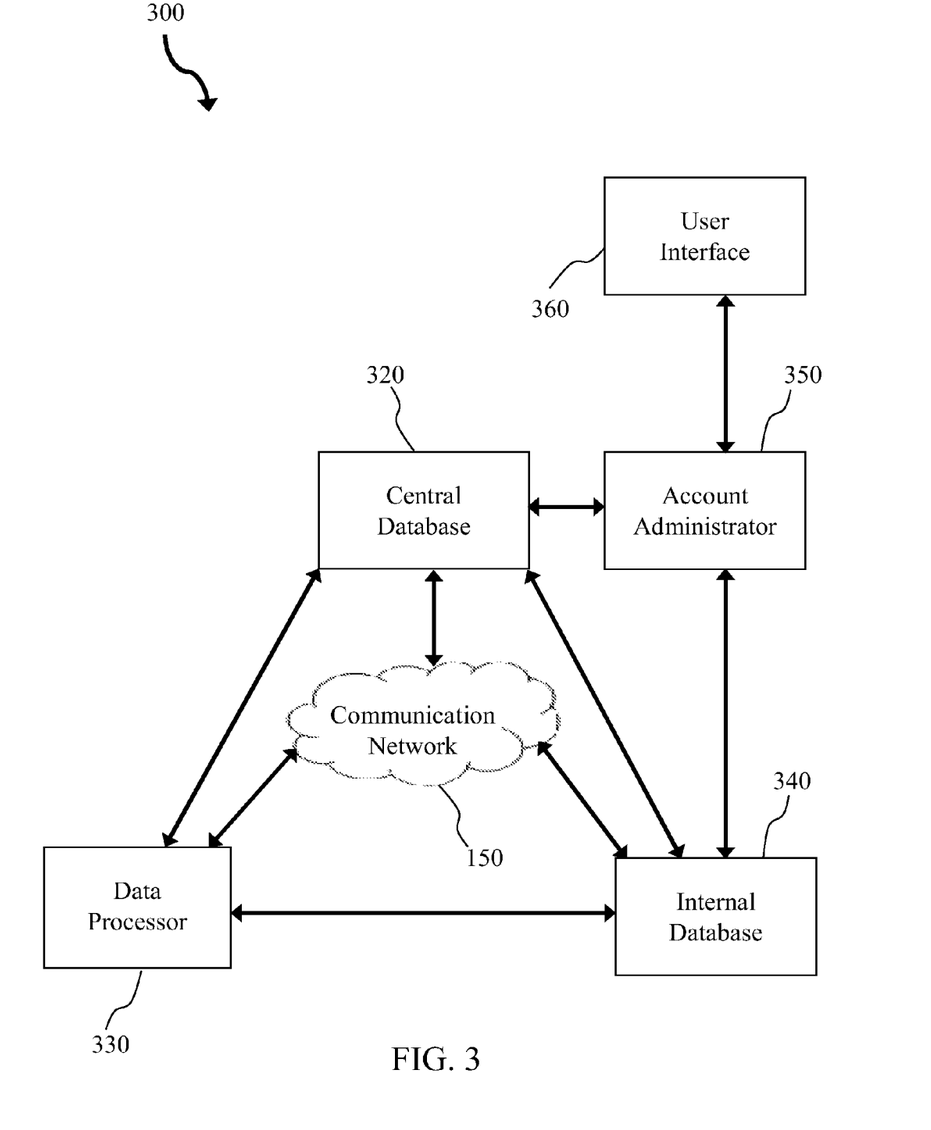
FIG. 3 illustrates a block diagram of an information management module according to an embodiment of the present invention.

FIG. 3 illustrates a block diagram of the information management module 300 of FIG. 1 according to an embodiment of the present invention. The information management module 300 includes a central database 320, a data processor 330, an internal database 340, an account administrator 350, and a user interface 360. The information management module 300 also includes the communication network 150 of FIG. 1. In varying embodiments, the internal database 340 may or may not be integrated within the user device 400.

The communication network 150, the central database 320, the data processor 330, and the internal database 340 are all in bidirectional communication with one another. Additionally, the account administrator 350 is in bidirectional communication with the central database 320, the internal database 340, and the user interface 360.

In operation, a new user of the system 100 creates an account with the information management module 300 via the user interface 360. The user interface 360 may include, for example, a keyboard, a display screen, a touch screen, a trackball, a microphone, a speaker, a trackwheel, and/or another device adapted for data manipulation, display, transmission, and/or selection. In certain embodiments, the creation of an account requires the installation of software to the user device 400. This software may be stored, for example, in the internal database 340. In creating its account, the new user provides information to the user interface 360, and this data is communicated to the account administrator 350. For example, the new user may indicate via the user interface 360 that she would like to create a new account with the information management module 300. In response to the request, the account administrator 350 may provide the user interface 360 a form containing a series of fields for the new user to complete in order to establish the new account. Such fields may request the new user to provide information such as a username and password, her actual name, her address, her phone number, the names of her friends with existing accounts, her interests, the items and/or services she is currently looking for, her bank and/or credit card information, her job title and description, and/or an image to be associated with the new user. Where the new user is a commercial entity, relevant information may include, for example, advertising content, promotional information, inventory and/or availability information, and product and/or service descriptions. Additionally, the new user may be prompted to provide a unique identifier associated with a device the new user wishes to use in conjunction with the system 100. This unique identifier may include, for example, a UUID or IMEI number, as described above with regard to FIG. 1. Additionally, the new user may be prompted to provide a security question and answer and/or a voice sample, fingerprint scan, or some other biometric identifier that may be used for verification purposes.

Once the new user has submitted this information via the user interface 360, the new account record is transmitted to the account administrator 350. The new account record is then stored by the account administrator 350 to the internal database 340. In certain embodiments, prior to creating a new account record, the account administrator 350 may search the central database 320 and/or the internal database 340 to ensure that the new user does not already have an account or has not chosen a username that conflicts with one already in use. The new account record may be stored from the internal database 340 to the central database 320. In alternative embodiments, a new account record may be transmitted directly to the central database 320. Additionally, if a user has previously created an account and would like to update the associated account record, the user may indicate this via the user interface 360. After the user has provided sufficient identifying information to locate the associated account record, the account administrator 350 may search the central database 320 and/or the internal database 340 in order to locate the user's account record. Once the record has been identified, it may be accessed from the central database 320 and/or the internal database 340 by the account administrator 350 and may be modified via the user interface 360.

In certain embodiments, the process of establishing a new account may be performed using the user device 400 intended for eventual use with the system 100. Alternatively, a new account may be established using a different device capable of communicating with the information management module 300. As a result, the user interface 360 may be an interface associated with the user device 400 intended for eventual use with the system 100 or a different interface. For example, a user may intend for her mobile phone to be used with the system 100 for purposes of identifying matching users and content. However, she may create her account with the system 100 by using the personal computer in her home that is adapted to communicate with the account administrator 350 via the Internet. In certain embodiments, the account creation process may be adapted to allow a new user to install the software simultaneously to multiple user devices 400. For example, the new user may wish to utilize both her laptop computer and her mobile phone with the system 100. Additionally, in embodiments where a user is associated with multiple user devices 400, the system 100 may be configured to allow synchronization between all user devices 400 associated with the user. Such synchronization may allow a user to modify, for example, her interests using her mobile phone and nonetheless provide updated information from her laptop computer without requiring independent updating of the laptop.

Additionally, the information management module 300 may be configured to assist a new user in creating his account. For example, some or all content may be suggested by the information management module 300, as in the form of a series of checklists and/or pull-down menus. Thus, a new user may supply his undergraduate school to the account administrator 350 via the user interface 360 by using pull-down menus. Using a first pull-down menu relating to the state in which the institution is located, he may select "Illinois." Using a second pull-down menu that has been populated by the information management module 300 to contain only undergraduate schools in the state of Illinois, he may select "University of Illinois at Urbana-Champaign." Similarly, in order to provide information about his hobbies, the user interface 360 may display a checklist of common hobbies and a field for the new user to write in additional hobbies not listed. As a result, the account record associated with the new user may be coded more accurately by avoiding misspellings and other inconsistencies, and the account setup process may be streamlined for the new user.

As described above with regard to FIGS. 1 and 2, the information management module 300 is adapted to identify data associated with one user's account record that matches and/or complements data associated with another user's account record. For example, when two user devices 400 are in close proximity to one another, one or both devices may transmit a request match resource (RMR) to the data processor 330 via the communication network 150. The RMR may include information such as the location of each device and/or one or more unique identifiers associated with the devices, such as the IMEI and/or UUID number associated with each device. Using the information provided by the RMR, the data processor 330 may search the central database 320 and/or the internal database 340 to identify the account record associated with each user or user device 400. The data processor 330 may also search the associated account records for information in each that matches and/or complements one another. In certain embodiments, the data processor 330 may be electrically connected to the central database 320 and/or the internal database 340 so that data transfer may be performed directly between these elements. Alternatively, data transfer between the data processor 330, the central database 320, and/or the internal database 340 may be performed via the communication network 150.

In certain embodiments, the matching data identified by the data processor 330 may be transmitted from the central database 320 to the internal database 340. The matching data may then be transmitted from the internal database 340 to one or both user devices 400 via the communication network 150. In an embodiment, the matching data may be modified and/or additional content may be added prior to the matching data being data being transmitted to the user devices 400 via the communication network 150. For example, the matching data may be combined with a descriptive message about the data, such as "There is a nearby user who shares your interest in __________." This additional content may be added, for example, by the data processor 330 to the matching data stored in the internal database 340. In an alternative embodiment, the internal database 340 and the central database 320 may consist of a single database.

In certain embodiments, the information provided by a user to the account administrator 350 may require the submission of confidential information. For example, the user may add the username and password associated with her profile from an existing online social network, which may assist in populating other relevant data fields such as interests, job history, and schools attended. Examples of such online social networks may include Facebook, MySpace, Friendster, Xanga, and Bebo. Such online social networks may also include online dating services, such as Match.com and eHarmony.com. Other confidential information that may be provided may relate to the user's finances, such as bank account information, credit card numbers, PayPal account information, and investment portfolios. By providing the information management module 300 with certain forms of confidential information, the user may be able to provide enhanced content to other users and/or utilize additional functions of the system 100. For example, a user of the system 100 who is interested in meeting another user for purposes of dating may provide the username and password associated with his Match.com account. As a result, some or all of his profile may be provided by the information management module 300 to another user who is interested in meeting someone with characteristics or interests matching those of the first user. In addition to providing additional content that may allow for a more thorough assessment of potential compatibility, the availability of the first user's profile in the information management module 300 may provide additional fields to be searched, increasing the chances for a match between users. In the commercial context, a user may provide her credit card account information to the information management module 300. By doing so, the user may be able to easily purchase an item that is identified by the system 100 as matching the user's interests. In an embodiment, the user may be prompted by the information management module 300 as to whether she would like to purchase the item. If so, the user may indicate affirmatively and the purchase may be made immediately, potentially with only a single click or other selection of data.

To maintain the privacy of confidential information, the system 100 may be configured in a variety of ways. For example, the user may be required to authenticate her identity for certain types of commercial or non-commercial transactions. For example, the system 100 may be configured, potentially by the user herself, to require that the user authenticate her identity before purchasing an item with a credit card associated with the user's account. In certain embodiments, such authentication may occur, for example, through verification of a password, a security question, an email confirmation, a fingerprint scan, a facial recognition, a retinal scan, and/or a vocal recognition. In an embodiment, the user may customize the level of required authentication, which authentication techniques will be required, and/or which activities will require authentication. In other embodiments, the operator of the system 100 may determine these settings. Additionally, the user may establish access levels for varying types of information in her account record. For example, she may set her mobile phone number to be accessible only to devices associated with individuals she has designated as friends within the system 100. In addition, the operator of the user device 400 may be prompted by the information management module 300 to confirm whether and what content to transmit in response to certain types of information requests originating from other user devices 400.

The information management module 300 also may be adapted to include additional security and user management features. For example, the information management module 300 may facilitate the collection and processing of feedback regarding topics such as the relevance of provided content and the improper use of the system 100 by other users. Based on user feedback, the operator of the information management module 300 may modify its data matching parameters and/or restrict the activities of delinquent users. In certain embodiments, such changes may be configured to take place automatically upon the occurrence of an event or the receipt of certain data. Moreover, the information management module 300 may require a waiting period for certain types of changes in a user's account record to take place. Such a feature may, for example, help to limit spontaneous targeting of individuals for purposes of harassment or other improper conduct. In an embodiment, a user may block all or some types of matched content associated with another user by communicating this intention to the information management module 300 via the user device 400.

Additionally, information may be organized within the information management module 300 in a variety of ways. For example, the central database 320 may be adapted to periodically or continually establish piles and subpiles of user information. A pile may include the account records or pointers thereto of all users of the system 100 that have communicated a particular interest to the information management module 300. For example, a pile may include the account records of all users interested in skateboarding. Similarly, another pile may include the account records of all users currently looking to purchase a used car. Each pile may consist of a number of subpiles, each of which is associated with a specific geographic area. For example, the skateboarding pile may include three subpiles, each containing the account records or pointers thereto of two users from the group A-F. The first subpile may include the account records of A and B, where A and B are both interested in skateboarding and currently located in geographic area 1. The second subpile may include the account records of C and D, who are both interested in skateboarding and currently located in geographic area 2. The third subpile may include the account records of E and F, each of whom is interested in skateboarding and currently located in geographic area 3. By regularly organizing information into piles based on interest and subpiles based on geographic area, data stored in the central database 320 may be accessed and matched more efficiently than would be possible using a different data structure. In alternative embodiments, it may be beneficial to organize piles based on geographic area and subpiles based on interests. In certain embodiments, the information management module 300 may be adapted to automatically modify the data structure of the central database 320 and/or the internal database 340 according to benchmarks, rules, or other pre-established conditions. In other embodiments, the operator of the information management module 300 may selectively alter one or more data structures associated with the information management module 300.

In certain embodiments, the information management module 300 may provide content to the user device 400 besides the matched content identified by a RMR-based search of the central database 320. For example, the central database 320 may be adapted to include general data that may be commonly requested by users, such as current news, hyperlinks, ringtones, and/or video files. Despite not being matched content per se, pieces of general content may be provided to the user device 400 in cases where predetermined rules implemented by the data processor 320 determine that the content is likely to be relevant to the user. In varying embodiments, such general content may be selectively accessed by the operator of the user device 400, always provided by the information management module 300, or provided only upon the occurrence of a specified event, such as a failure by the information management module 300 to identify matched content. Additionally, the information management module 300 may provide assistance in locating an identified user device 400 associated with matched content. For example, the information management module 300 may provide turn-by-turn directions for locating the matched content and/or the user device 400 associated with the matched content. Similarly, a map may be provided that identifies landmarks, streets, user devices 400, and/or other items of interest. In an embodiment, the information management module 300 may provide hyperlinks to matched content in addition to or instead of providing some or all of the matched content itself. Moreover, the information management module 300 may provide a percent match figure quantifying the relevance of the matched content to the content requested, which may be determined by the data processor based on pre-determined criteria. In varying embodiments, the rules for determining the type of content to transmit from the information management module 300 to the user device 400 may be established and subsequently modified by the operator of the information management module 300 and/or the operator of the user device 400.

In certain embodiments, the information management module 300 may be configured to facilitate intelligent discovery of user devices 400 and matched content. For example, searches for nearby user devices 400 may be initiated by the information management module 300 by communicating with the user device 400. In other embodiments, such searches may be initiated at the direction of the user, upon the occurrence of a pre-established event, or upon the passage of a certain period of time. Moreover, searches for proximate user devices 400 may be initiated based upon a correlation in geographic data associated with each user device 400 that is detected by the information management module 300. For example, upon two user devices 400 in close proximity communicating their geographic data to the information management module 300, a search of the central database 320 for matched content may be initiated automatically. By providing matched content and/or full account records of proximate user devices 400 to the internal database 340 automatically, subsequent user-initiated searches may be expedited because the content to be searched is loaded locally to the user device 400.

In certain embodiments, the information management module 300 may be adapted to function differently with regard to user devices 400 that are currently located in areas particularly crowded with user devices 400 connected to the system 100. For example, a user device 400 located at a large concert at which thousands of other user devices 400 are present may present challenges to the user device 400 and/or the information management module 300. With so many user devices 400 in such close proximity, the information management module 300 may become overwhelmed with attempting to identify matched content for users, increasing the time needed to identify matched content. Moreover, users may be overwhelmed by the amount of matched content being received in such a short period of time, potentially causing them to disregard or overlook potentially valuable matched content. In situations where the information management module 300 determines the concentration of user devices 400 to be too great, it may narrow the bounds of proximity in order to provide users with matched content associated with user devices 400 located very close to them. Similarly, the delivery of matched content may be limited in number, such that, for example, the information management module 300 returns matched content relating to the first ten user devices 400 identified upon entering the highly concentrated area. Alternatively, the identification and delivery of matched content may be prioritized by the user and/or the information management module 300 in one or more ways. For example, if a user has indicated that she is more interested in finding a job in software development than she is in meeting others who share her favorite movie, the information management module 300 may provide matched content related only to job opportunities. A user may establish or update these preferences during the initial account setup process or at any time thereafter. In certain embodiments, the information management module 300 may automatically prioritize matched content based on rules that may be, for example, pre-programmed by the operator of the information management module 300 and/or based upon the average prioritization preferences across the system 100 or some subset thereof.

In addition, the alternative embodiments described above with regard to FIGS. 1 and 2 are also applicable to the information management module 300 illustrated in FIG. 3.

Figure 4:
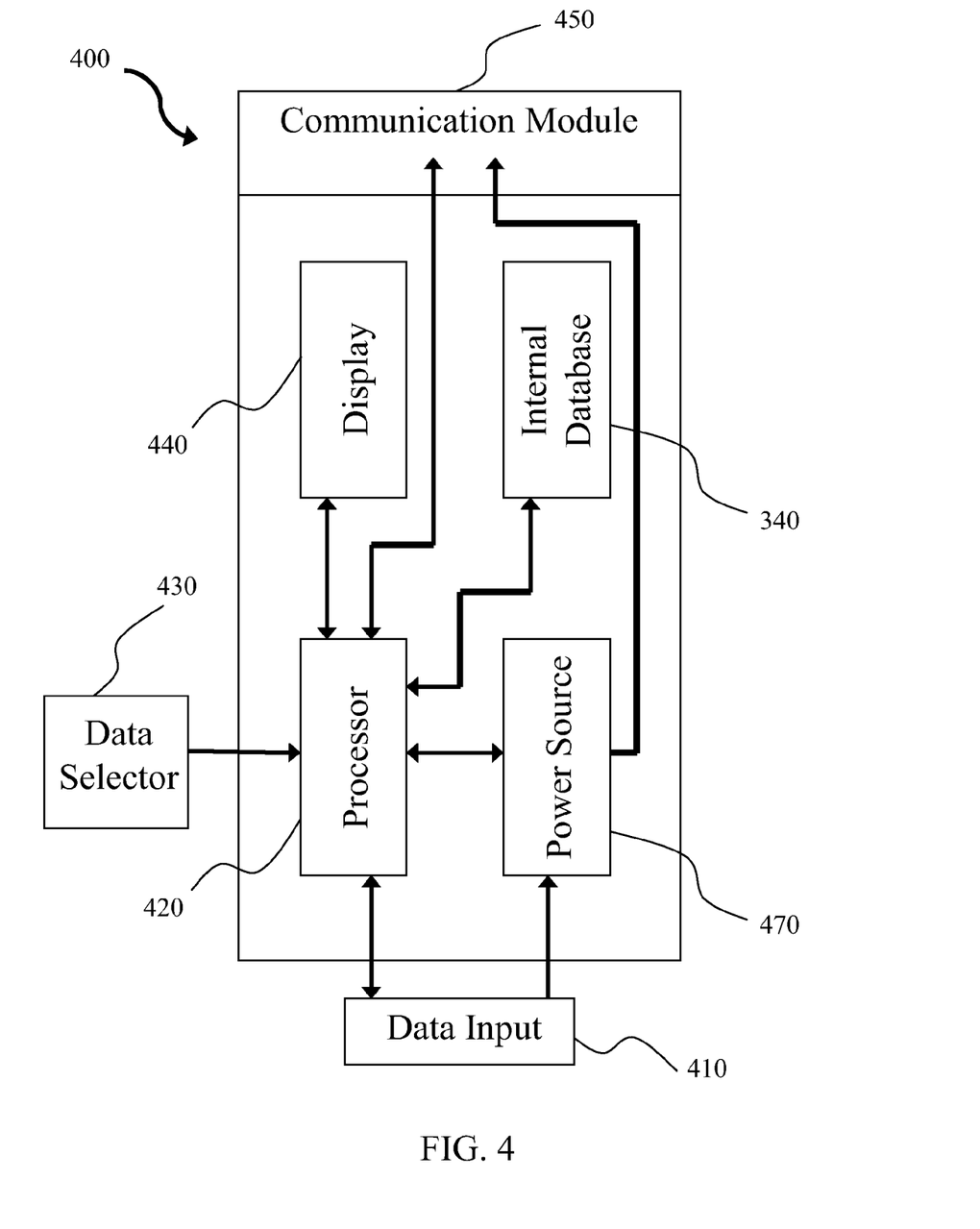
FIG. 4 illustrates a block diagram of a user device according to an embodiment of the present invention.

FIG. 4 illustrates a block diagram of the user device 400 of FIG. 1 according to an embodiment of the present invention. The user device 400 includes a data input 410, a processor 420, a data selector 430, a display 440, a communication module 450, an internal database 340, and a power source 470.

The data input 410 is in bidirectional communication with the processor 420 and provides data to the power source 470. The processor 420 also is in bidirectional communication with the display 440, the communication module 450, the power source 470, and the internal database 340. The power source 470 is also in electrical communication with the communication module 450. The data selector 430 is in electrical communication with the processor 420.

In operation, data relating to a user and/or matched content is received at the data input 410 from a computer or database containing such information, such as the central database 320 of FIG. 3. The transmission of content from the information management module 300 of FIG. 3 to the data input 410 may be facilitated by the communication module 450. The communication module 450 may utilize wireless technologies such as GSM, CDMA, WiFi, GPS, Bluetooth, wireless local area networks (WLAN), wireless USB, and/or infrared. Additionally, proprietary wireless standards utilizing audible, optical, and/or radio technologies may be used. In still other embodiments, the communication module 450 may be configured for direct electrical connection through, for example, USB, Ethernet, optical cable, and/or FireWire connections.

Once received at the data input 410, some or all of the data is provided to the processor 420, which may store the received data to the internal database 340. When the user device 400 is configured to display matched content, the processor 420 then provides some or all of the content stored in the internal database 340 to the display 440 for viewing by the user. If multiple pieces of matched content are stored in the internal database 340, the user may scroll through or selectively display pieces of content using the data selector 430. In certain embodiments, the data selector 430 may include a keyboard, a touch screen, a trackball, a microphone, one or more action buttons, a knob, one or more switches, a trackwheel, and/or another device or actuator adapted for data manipulation and/or selection. In certain embodiments, the display 440 may display data using display technologies such as black-and-white liquid crystal display (LCD), color LCD, digital light processing (DLP), plasma, or light-emitting diodes (LED).

To power each of these operations, the user device 400 draws power from the power source 470. In an embodiment, the power source 470 is an internal rechargeable battery that is recharged when the user device 400 is in electrical communication with an electrical outlet, computer, or other source of electrical power. For example, power may be transmitted to the power source 470 by a computer through the data input 410. In certain embodiments, the power source 470 may be removed and replaced by an operator of the user device 400. In order to minimize power consumption while still identifying relevant matched content, the user device 400 may be configured in accordance with one or more power management schemes. For example, the user device 400 may be adapted to include an off mode, in which the user device 400 ceases some or all interactions with the information management module 400. Additionally, the user device 400 may include a silent mode, in which no notifications or matched content are communicated to the user until the user device 400 is removed from silent mode. In an embodiment, the power source 470 may also be configured to power off the user device 400 or to stop searching for other users and matched content after a specified period of time spent in silent mode.

In certain embodiments, the internal database 340 may be physically integrated within the user device 460. In other embodiments, the internal database 340 may be selectively removed by the operator of the user device 400. In these embodiments, the internal database 340 may include, for example, a Secure Digital (SD) Card, a Memory Stick (MS), a SmartMedia (SM) device, a Multimedia Card (MMC), a USB storage medium, a CompactFlash (CF) device, or some other portable memory technology.

As described above with regard to FIG. 3, interaction with the information management module 300 may require the installation of software to the user device 400. Such software may be received at the data input 410 and subsequently stored to the internal database 340 by the processor 420. In certain embodiments, this software may direct the data communication and processing between user devices 400. Example functionalities handled by software may include querying the information management module 300 for matched content, querying unique identifiers such as IMEI or UUID numbers associated with other user devices 400, providing notifications to operators of the user devices 400, monitoring environmental conditions such as average ambient noise, managing power consumption, encrypting sensitive data, reporting data, downloading information, interacting with other user devices 400, facilitating commercial transactions, and processing matched content and other information. Notifications provided by the user device 400 may include auditory and/or visual signals or indicators. Other notifications may be presented in the form of a vibration of the user device 400, a neurological impulse, and/or a confirmation of an action taken. For example, where there is an established but unsettled debt between the operators of two user devices 400, a notification may include a message indicating that the debt has been settled by transferring funds from a financial account associated with one user to an account associated with the other user. In certain embodiments, the software adapted for use with the system 100 may run continuously in the background of the operating system associated with the user device 400. Alternatively, some or all the software may be launched upon activation by the operator of the user device 400 and/or the information management module 300.

Additionally, the user device 400 may be adapted to utilize the communication module 450 to obtain software updates from the information management module 300 via the data input 410. Updates may be obtained and installed, for example, selectively by the user and/or automatically according to an established schedule or the occurrence of a specified event.

In certain embodiments, the user device 400 may not be designed specifically for use with the anonymous digital identification system 100. For example, the user device 400 may be a mobile phone, a smartphone, a laptop, or some other electronic communication device. Alternatively, the user device 400 may be an electronic communication device specifically designed for use with the system 100. In these embodiments, the user device 400 may offer enhanced functionality and/or features, in comparison to a user device 400 not specifically designed for use with the system 100. For example, a specially-designed user device 400 may include all available location detection technologies in order to fully utilize the multi-modal nature of the system 100. By interacting with the system 100 with a user device 400 having Bluetooth, GPS, audio, radio, optical, cellular, WiFi, wireless USB, and infrared capabilities, the operator of the user device 400 increases her likelihood for identifying proximate users sharing her interests and/or objectives. In order to prevent excessive power consumption, some or all of these functionalities may be prioritized and/or inactive until specifically selected by the operator of the user device 400.

In addition, the alternative embodiments described above with regard to FIGS. 1-3 are also applicable to the user device 400 illustrated in FIG. 4.

Figure 5:
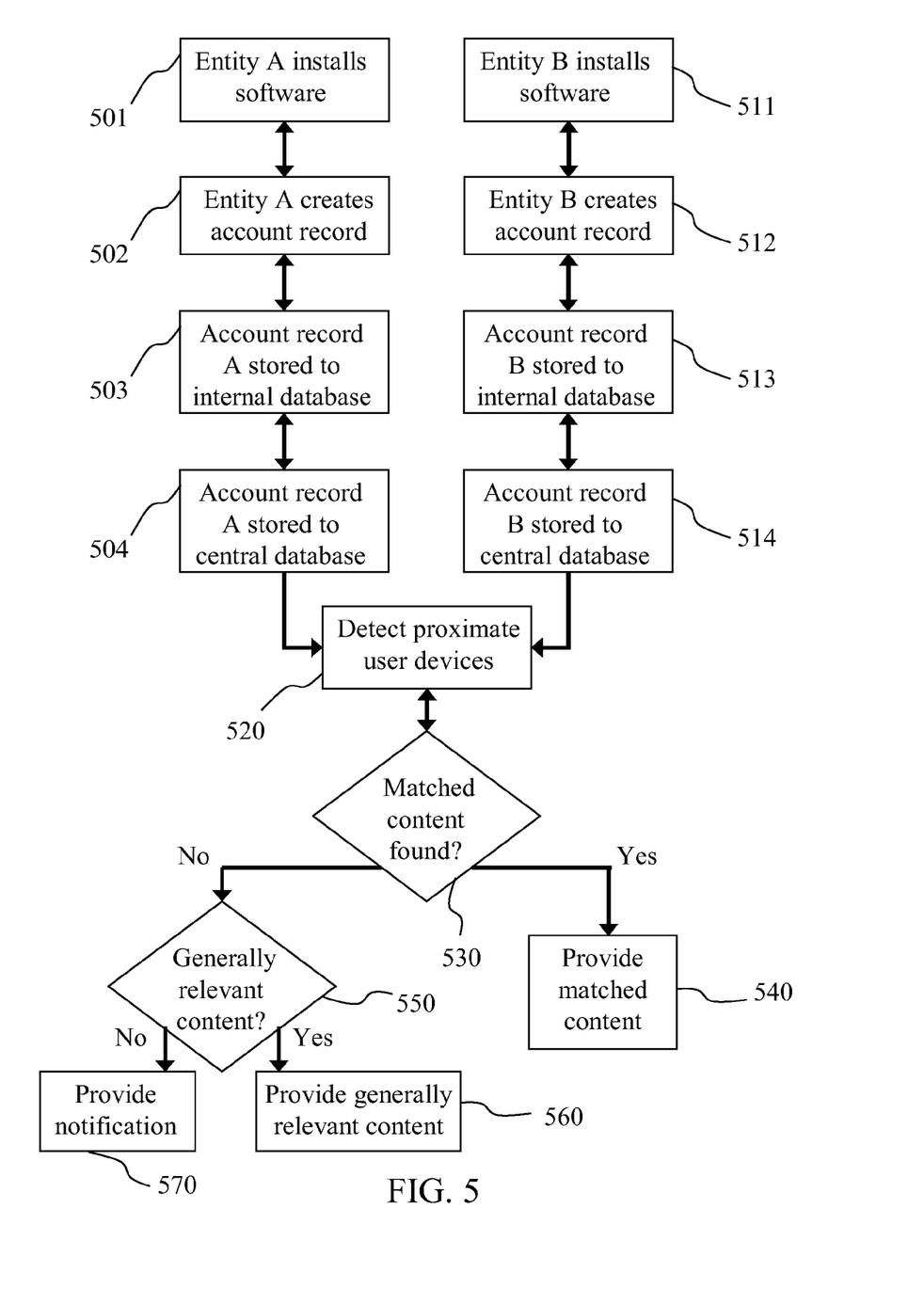
FIG. 5 illustrates a flow chart of a content matching and distribution process according to an embodiment of the present invention.

FIG. 5 illustrates a flow chart of a process 500 for providing matched content to two user devices 400 according to an embodiment of the present invention. At step 501, a first entity installs software associated with the anonymous identification system 100 of FIG. 1 to a first user device 400. Next, at step 502, the first entity creates an account record with the account administrator 350 of FIG. 3. At step 503, the first entity's account record is stored to an internal database 340 associated with the first user device 400. At step 504, the first entity's account record, or a copy thereof, is transmitted from the internal database 340 to a central database 320 associated with the information management module 300 of FIG. 3. Similarly, at step 511, a second entity installs software associated with the anonymous identification system 100 to a second user device 400. Next, at step 512, the second entity creates an account record with the account administrator 350. At step 513, the second entity's account record is stored to an internal database 340 associated with the second user device 400. At step 514, the second entity's account record, or a copy thereof, is transmitted from the internal database 340 to the central database 320. Each of the first and second account records may include, for example, information regarding the entity's interests, the products and services the entity wishes to buy or sell, the entity's personal and/or professional background, one or more images, the entity's geographic location, advertising or promotional material, hyperlinks to locations of data accessible by the Internet or a local network, and/or any other content that may be associated with an entity.

At step 520, the user device 400 associated with the first entity detects the presence of the user device 400 associated with the second entity. Such detection may be facilitated by one or more of the location detection technologies described above with regard to FIGS. 1-4. At decision point 530, the central database 320 is searched for matched content between the account records of the first and second entities. Such matched content may include, for example, a shared interest in a particular activity and/or a complementary interest in buying/selling a particular product. If, at decision point 530, matched content is found, then the matched content is provided to each user device 400 at step 540. In certain embodiments, the information provided may also include the full account record of the entity associated with matched content, or some portion thereof. If, at decision point 530, no matched content is found, then the information management module 300 may search at decision point 550 for generally relevant content directed to, for example, a particular interest of either or both entities. Generally relevant content may include, for example, news stories, advertisements, and/or data files. If, at decision point 550, generally relevant content is found in the central database 320 or, for example, on a particular website, then at step 560, such generally relevant content may be provided to one or both user devices 400. If, at decision point 550, no generally relevant content is found, then at step 570 an indication that no relevant content is available may be provided to one or both user devices 400.

In certain embodiments, the steps comprising the process of providing matched content to two user devices 400 may be combined, separated and/or reordered in ways that do not affect the overall process. For example, step 501 may be unnecessary to perform if the first entity's user device 400 has already been loaded with the software needed to interact with the system 100. In still other embodiments, a new user may complete her profile online in communication with the information management module 300 without the use of software installed on the user device 400. Similarly, the creation of a new account record may be unnecessary where an entity has already established an account record and only seeks to modify its existing record. As a further example, in certain embodiments, the internal database 340 may be located within the user device 400 or associated with software installed therein, while in other embodiments, the internal database 340 may be part of the information management module 300 and physically connected to the central database 320. In varying embodiments, the step 530 of searching the central database 320 for matched content may be initiated selectively by the user, automatically by the information management module 300, and/or automatically upon the occurrence of a particular event.

In yet another embodiment, the overall anonymous identification system 100 of FIG. 1 may be adapted for interaction with a human-computer interface for communication that does not require physical motor control or speech production. Such an interface may include a system for intercepting neurological signals detectable near a user's head and/or neck that may be translated into audible or visible speech via encryption and/or signal processing. For example, the interface and signal processing associated with The Audeo, produced by Ambient Corporation, may be utilized in conjunction with the system 100 in order to provide enhanced functionality. In certain embodiments, such enhanced functionality may include the ability for users of the system 100 to communicate with one another, with their user devices 400, and with the information management module 300 without producing audible speech or utilizing physical motor control. In operation, an electrode or other device capable of conducting neurological signals may be positioned near or in direct contact with a user's head or neck. The electrode intercepts neurological signals created by the user that represent the user's unspoken thoughts. These intercepted signals may be encrypted, processed, and analyzed in order to translate the signals into speech, text, and/or data selection. In such an embodiment, notifications or other content may be provided as a neurological input to a user of the system 100. Additionally, in an embodiment, the electrode may be integrated within or otherwise in communication with the user device 400. Embodiments utilizing such a human-computer interface become increasingly useful as user devices 400 continue to shrink in size and make data entry through keypads, for example, progressively more difficult.

In an embodiment, the system 100 provides universal translation capabilities. By utilizing text and/or speech translation software, the system 100 may allow two users who speak different languages to communicate effectively with one another. Because the system 100 facilitates communication among geographically proximate users through an intermediary, the information management module 300, translation software associated with the system 100 may translate content provided by one user whose native language is Spanish, for example, to digitally communicate with a French-speaking user in a seamless way. Such capabilities may be particularly useful, for example, to a user of the system 100 who is traveling in a foreign country and wishes to ask someone a question but does not speak their language. Moreover, if the account record associated with the traveler's user device 400 includes her native language of Spanish, then she may use the information management module 300 to identify geographically proximate Spanish speakers while traveling in France. In effect, the system 100 may function both as an identifier of users who speak particular languages and as a flexible translator.

By affording the various features described above, the system 100 may provide a user with a more personalized form of reality. As described above with regard to FIG. 2, the system 100 may be utilized by commercial entities in order to provide advertising content that is specifically targeted to individual users. Moreover, in an embodiment, a user device 400 adapted for communication with the information management module 300 may assist users in interacting with computers. For example, the account record associated with a user device 400 may include the preferences, settings, programs, and/or data files associated with a user's desired computing environment. Upon the user device 400 becoming geographically proximate to a second user device 400 such as a personal computer, the system 100 may facilitate the transformation of the personal computer into the computing environment preferred by the user. Similarly, the user device 400 may be used to authenticate the user's identity by transmitting authenticating information to the information management module 300 and/or a geographically proximate second user device 400. In another embodiment, the music heard and/or other media received by a user of the system 100 may be customized to her interests. For example, a car's features may include a user device 400 that is connected to the car's stereo system. The car's user device 400 may be equipped with, for example, Bluetooth functionality. When a user device 400 associated with a first driver comes into geographic proximity with the car's user device 400, the music interests of the first driver are received by the car's user device 400, and the stereo is adjusted accordingly to match the first driver's interests. After the first driver exits the vehicle and a second driver having different music interests enters, the user device 400 associated with the second driver and/or the information management module 300 transmits information related to the second driver's music interests to the car's user device. As a result, the car's stereo system is readjusted to accommodate the second driver's music interests.

As described herein, embodiments of the present invention offer valuable solutions to the problems associated with traditional communication systems and techniques. Individuals and commercial entities alike miss opportunities for valuable communication every day. Many people forego opportunities to interact with people who share their interests or can provide them with products, services, or information they want, simply because they are unaware of these connections. In terms of commerce, people are bombarded with blanketed and minimally targeted advertising that is often largely ineffectual in terms of prompting commercial transactions. Embodiments of the present invention allow commercial and non-commercial entities to identify opportunities for valuable communication and provide information as to shared and complementary interests. As a result, embodiments of the present invention offer unparalleled opportunity and efficiency to both individuals and commercial entities.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A method for providing matched content, the method including:
    detecting the presence of a first wireless communication device associated with a first set of content that is distinguishable from an identifier associated with said first wireless communication device;
    detecting the presence of a second wireless communication device associated with a second set of content that is distinguishable from an identifier associated with said second wireless communication device; and
    in response to a determination that said first and second wireless communication devices are geographically proximate to one another based on location detection capabilities of said first and second wireless communication devices, providing matched content to at least one of said first and second wireless communication devices, wherein said matched content is based at least in part on said first set of content, said second set of content, and a shared or complementary interest associated with said first and second wireless communication devices, and wherein said interest was previously expressed by a user of said first or second wireless communication device.

2. The method of claim 1, wherein at least one of said first and second wireless communication devices is associated with a unique identifier.

3. The method of claim 1, wherein said matched content is provided to said second wireless communication device via direct communication with said first wireless communication device, wherein said direct communication includes at least one of electrical communication and wireless communication.

4. The method of claim 1, wherein said first set of content includes information associated with and provided by a user of said first wireless communication device.

5. The method of claim 4, wherein said information provided by said user of said first wireless communication device comprises an amount said first user is willing to pay for said second set of content.

6. The method of claim 1, wherein said matched content is based at least in part on a request match resource operation performed in response to a determination that said first and second wireless communication devices are geographically proximate to one another.

7. The method of claim 1, wherein at least one of said first set of content, said second set of content, and said matched content is communicated via a human-computer interface.

8. The method of claim 1, wherein at least one of said first set of content, said second set of content, and said matched content is processed by a translator.

9. The method of claim 1, wherein a user of said first wireless communication device and a user of said second wireless communication device are anonymous to one another.

10. The method of claim 1, comprising allowing open communication between said first and second wireless communication devices, wherein said open communication selectively relates to said matched content, as determined by at least one of a user of the said first wireless communication device and a user of said second wireless communication device.

11. The method of claim 1, comprising automatically performing a transaction payment upon providing said matched content to said at least one of said first and second wireless communication devices.

12. A method for facilitating commercial transactions, the method comprising:
    in an information management module that is operable to communicate with a non-commercial wireless communication device and/or a commercial wireless communication device:
        identifying consumer information associated with said non-commercial wireless communication device, wherein said consumer information is not limited to an identifier associated with said non-commercial wireless communication device;
        identifying provider information associated with said commercial wireless communication device, wherein said provider information is not limited to an identifier associated with said commercial wireless communication device;
        determining whether geographic proximity exists between said non-commercial wireless communication device and said commercial wireless communication device based on location detection capabilities of said first and second wireless communication devices;

identifying whether shared or complementary information exists between said consumer information and said provider information in response to a determination that geographic proximity exists between said non-commercial wireless communication device and said commercial wireless communication device; and providing said consumer information to said commercial wireless communication device and/or providing said provider information to said non-commercial wireless communication device.

13. The method of claim 12, wherein said provider information is associated with a commercial entity, wherein said provider information includes at least one of an advertisement, description, image, price, quantity, offer for sale, review, comparison, and location associated with at least one of a product and a service associated with said commercial entity.

14. The method of claim 12, comprising processing said consumer information, wherein said processing includes at least one of compiling, analyzing, and drawing conclusions from said consumer information, and wherein said consumer information includes at least one of raw data, processed data, and extrapolated consumer data.

15. The method of claim 12, comprising analyzing availability of at least one of a product and a service, wherein said analysis is performed by an inventory management unit associated with said commercial entity.

16. The method of claim 12, comprising allowing one or more commercial entities to purchase association rights with regard to at least one of an associable element and said consumer information, wherein said provider information provided to said non-commercial wireless communication device is based at least in part on said association rights.

17. The method of claim 12, comprising allowing a commercial transaction between said commercial device and said non-commercial wireless communication device, wherein said commercial transaction includes a transfer of at least one of a product, a service, currency, and feedback.

18. The method of claim 12, comprising automatically performing a transaction payment upon providing said consumer information to said at least one of said first and second wireless communication devices.

19. A system for providing matched content, the system comprising:

a processor that is operable to determine a geographic location associated with an electronic device and whether two or more electronic devices are geographically proximate to one another; and an information management module that is operable to:

communicate with a first wireless communication device and/or a second wireless communication device, wherein said first wireless communication device is associated with a first set of content that is distinguishable from an identifier associated with said first wireless communication device and said second wireless communication device is associated with a second set of content that is distinguishable from an identifier associated with said second wireless communication device;

provide matched content to at least one of said first and second wireless communication devices in response to a determination by said processor that said first and second wireless communication devices are geographically proximate to one another based on location detection capabilities of said first and second wireless communication devices, wherein said matched content is based at least in part on at least one of said first set of content and said second set of content.

20. The system of claim 19, wherein said first wireless communication device and said information management module are electrically integrated with one another.

21. The system of claim 19, wherein said first wireless communication device comprises a display operable to display matched content to a wireless communication of said first wireless communication device.

22. The system of claim 19, wherein at least one of said first wireless communication device and said information management module is adapted to allow a user to modify at least one of said first set of content and a preference associated with providing matched content.

23. The system of claim 19, wherein said system is multimodal.

* * * * *